United States Patent [19]
Lacy et al.

[11] Patent Number: 6,016,335
[45] Date of Patent: Jan. 18, 2000

[54] TELEPHONE REGISTRATION SYSTEM FOR SCHOOLS

[76] Inventors: Alex B. Lacy, Route 1, Box 3198A, Farmington, Ark. 72730; Justin J. Green, 228 Pleasant Hill Dr., Winona, Minn. 55987

[21] Appl. No.: 08/846,968

[22] Filed: Apr. 30, 1997

Related U.S. Application Data

[63] Continuation of application No. 08/670,539, Jun. 27, 1996, abandoned, which is a continuation of application No. 08/544,405, Nov. 16, 1995, abandoned, which is a continuation of application No. 08/388,505, Feb. 14, 1995, abandoned, which is a continuation of application No. 08/151,839, Nov. 15, 1993, abandoned, which is a continuation of application No. 07/850,838, Mar. 13, 1992, abandoned.

[51] Int. Cl.[7] .................................................. H04M 1/64
[52] U.S. Cl. ......................... 379/67; 379/93.12; 705/26; 705/28
[58] Field of Search .................................. 379/67, 88, 89, 379/92.01, 93.12, 93.13, 70; 340/825.3, 825.31, 825.34, 825.25, 825.28, 825.29; 395/201; 705/5, 12, 26, 28

[56] References Cited

U.S. PATENT DOCUMENTS

| | | | |
|---|---|---|---|
| 4,255,619 | 3/1981 | Saito | 379/96 |
| 4,845,739 | 7/1989 | Katz | 379/93 |
| 5,016,270 | 5/1991 | Katz | 379/93 |
| 5,113,430 | 5/1992 | Richardson, Jr. et al. | 379/88 |

OTHER PUBLICATIONS

Class Registrar Host Efficient Programmer's Guide, Applied Voice Technology, 1991, pp. 22–26.

9270 Voice Response Unit General Information Manual, IBM GU 10–3000–01, 1989, pp. 19–21.

Applied Voice Technology Announces The Purchase of 1776, Oct. 10, 1989.

College's Voice Network Lets Students Sign Up By Telephone Communications News, Aug. 1990 p. 34.

Computer Communication's Specialists, Inc., an IBM Value Added Remarketer, Announces Its New Touch–Tone Audio Response System, Sep. 25, 1985.

Network World "Voice Response Simplifies Cal. State Class Registration" v8, n11, p. 27, Mar. 18, 1991.

Primary Examiner—Fan S. Tsang
Attorney, Agent, or Firm—G. Turner Moller

[57] ABSTRACT

The interactive student registration system uses a computer system having a telephone interface providing a multiplicity of incoming telephone lines, a memory, a voice synthesizer output and a data connection to a host data processor of the institution. The host data processor provides a series of information data banks including student information, course information and the like. By use of a touchtone telephone, a student calls the registration system and, by a series of interactive communications, registers for courses offered by the institution or obtains information relating to registration. A large series of operations is conducted including determining whether the student has paid property deposits, satisfying requirements such as instructor or advisor approval for particular courses, assuring that co-requisite and prerequisite requirements are met, assuring that graduate students, student instructors or scholarship students are taking a minimum number of hours and the like.

11 Claims, 8 Drawing Sheets

TELEPHONE REGISTRATION SYSTEM FOR SCHOOLS

This is a continuation of application Ser. No. application Ser. No. 08/670,539 filed on Jun. 27, 1996, now abandoned, which is a continuation of application Ser. No. 08/544,405 filed Nov. 16, 1995, now abandoned, which is a continuation of application Ser. No. 08/388,505 filed Feb. 14, 1995, now abandoned, which is a continuation of Ser. No. 08/151,839 filed Nov. 15, 1993, now abandoned, which is a continuation of application Ser. No. 07/850,838 filed Mar. 13, 1992, which is now abandoned.

BACKGROUND OF THE INVENTION

1. Technical Field

This invention relates to a registration system for colleges and universities in which the student calls the school on a touchtone telephone and, by interaction with the system of this invention, enrolls the student in the institution.

2. Background Art

Telephone registration systems have been proposed and adopted in the past in a number of colleges. Even after the initial bugs have been worked out, these systems have not been wholly satisfactory because (1) they have not successfully registered a sufficiently high percentage of the students who have attempted registration by telephone and (2) they apply to limited and specific aspects of registration, leaving many aspects to be accomplished manually. Even after all the effort of installing and operating conventional telephone registration systems, it is often found that only 50% of the students successfully register by telephone. This is, of course, a substantial workload that is transferred from the conventional manual registration system, but it leaves more to do than is desired.

It has been found that conventional telephone registration systems do not handle, or attempt to handle, many common situations requiring interaction between the student seeking to register and some requirement of the school. For example, many schools are required by law to require students to pay and maintain a property deposit. Such "special problems" are not now handled by telephone registration systems and are relegated to an adjunct enforcement strategy. As another example, a sizeable percentage of students are required to take a minimum number of class hours to qualify for scholarships, fellowships, research assistantships or instructorships. Present telephone registration systems are not able to monitor or enforce such regulations. Those who wish to do so may outmaneuver the system, making it necessary for the university to institute auxiliary monitoring programs. In another example, registration for certain courses in some schools require approval of a faculty member, usually a course instructor or a faculty advisor, or both. Present telephone registration systems are not able to handle this situation and either require conventional registration or are inflexible and prevent this type faculty control over classes. In this invention, many different categories of students and student problems are handled to successfully enroll students.

SUMMARY OF THE INVENTION

The goal of this invention is to provide a telephone registration system for schools which successfully registers 90% of the students attempting registration. After identifying the causes of unsuccessful telephone registration, subroutines of the basic registration process provide the means to handle those situations which create failure rates of 1% or more. Indeed, the registration system of this invention is sufficiently detailed that those conditions now being addressed create a failure rate on the order of a few tenths of one percent.

The first problem was to identify those causes which create significant registration failure rates. The second problem was to provide a routine in the telephone registration process that overcomes the particular identified cause.

The achievement of the goals of this invention is that no parallel or manual registration system has to be provided. Students do not have to come to the campus for any aspect of the registration process. When they have completed their interaction with the registration system of this invention, they simply buy books and go to class.

It is an object of this invention to provide an improved telephone registration system for schools.

A more specific object of this invention is to provide an improved telephone registration system for schools that identifies many of the problem areas creating significant registration failures and providing solutions.

These and other objects of this invention will become more fully apparent as this description proceeds, reference being made to the accompanying drawing and appended claims.

DETAILED DESCRIPTION OF THE PREFERRED EMBODIMENT

Figure 1:
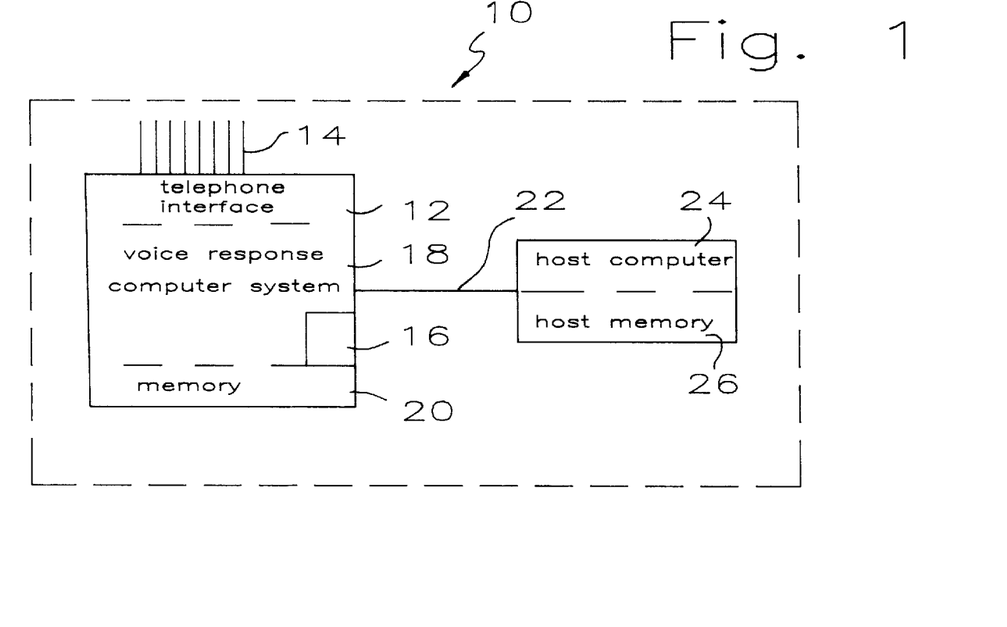
FIG. 1 is a schematic view of the hardware of the touchtone student registration system of this invention.

Referring to FIG. 1, a touchtone student registration system 10 is schematically shown comprising a telephone interface 12 having a multiplicity of incoming telephone lines 14, a voice transmission device 16 to deliver voice messages to the calling students incorporated in a computer system 18 connected to the telephone interface 12 for simultaneously handling a multiplicity of registering students, a memory 20 which may be RAM, a storage device or a combination thereof, and a connection 22 to a host computer 24 of the institution. The host computer 24 provides one or more information data bases in a memory or storage device 26 on students admitted to the institution including name, address, telephone number, major, student classification such as freshman, sophomore, junior, senior, graduate student, international student, handicapped student, a student teacher or research instructor on scholarship, the student's ID, security numbers and the like. The host computer 24, by specially designed system program tables, also provides data bases on courses offered by the institution, including seat availability in those courses, the relation between courses, i.e. whether they are or have prerequisites, co-requisites or the like. In one sense, the touchtone registration system 10 of this invention provides an interface between the student seeking to register and the host computer 24 in lieu of an employee of the registrar operating a terminal connected to the host computer 24.

Figure 2:
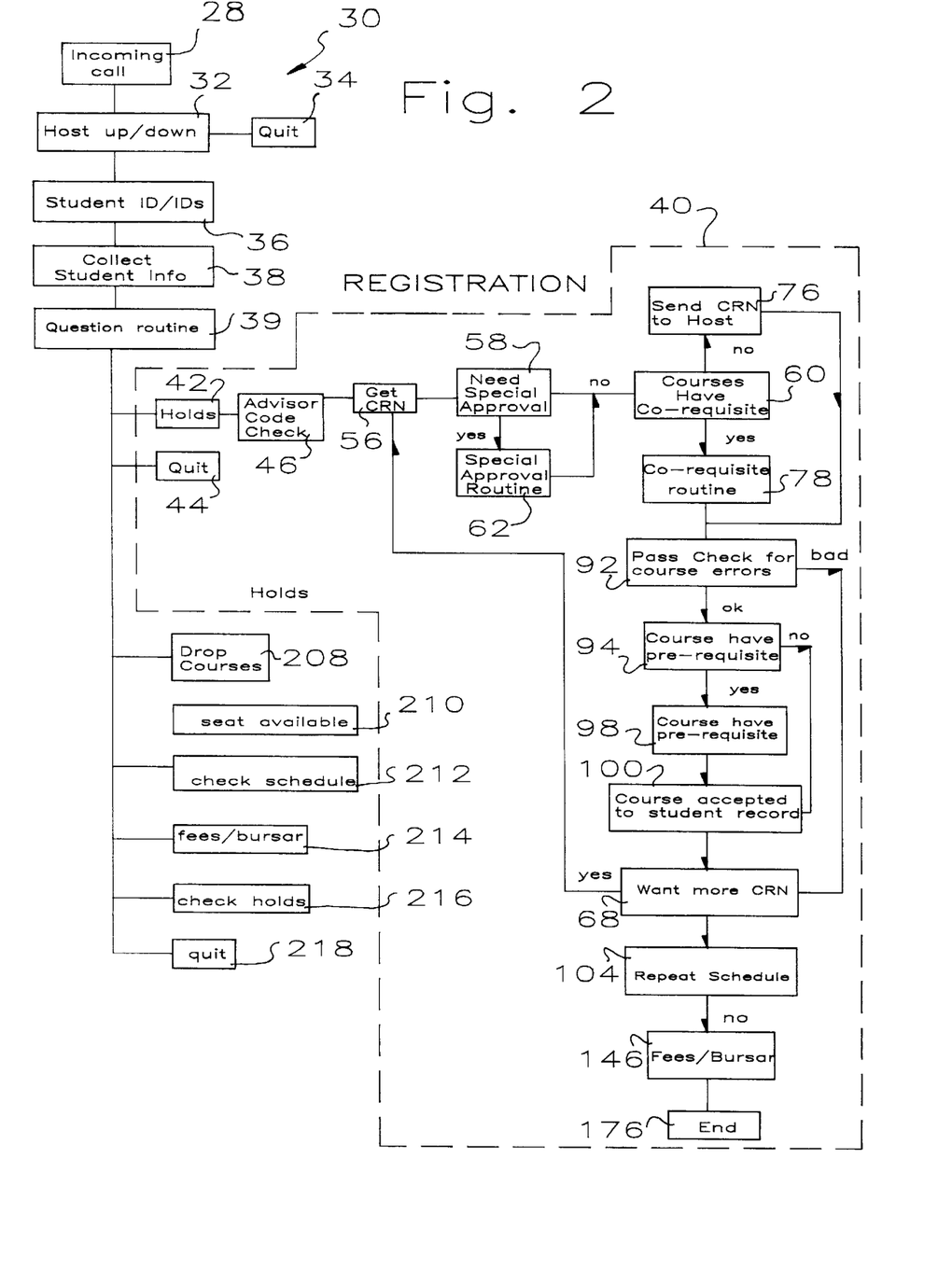
FIG. 2 is a flow chart diagram of the broad registration— information process allowing a student to acquire over a touchtone telephone registration information and to register for courses offered by the institution.

Referring to FIG. 2, there is illustrated a much simplified version of the invention and the principal steps of the computer system when the program is run on the system 10 of FIG. 1. An incoming call 28 starts the program 30 by starting a routine 32 which determines whether the host computer 24 is operating or not. If the host computer 24 is not operating, the registration attempt aborts through a quit routine 34 which informs the student through the voice transmission device 16 in the telephone interface 12.

If the host computer 24 is operating, a student ID routine 36 executes and the voice transmission device 16 asks the student for student ID and personal ID numbers and the term for which registration is sought. As in all responses to questions in this invention, the student enters information, confirms or cancels each entry by pressing buttons on the touchtone keypad. If the student cannot deliver an identification number which matches with information in the host computer 24 for the specific term requested, the registration attempt aborts though the quit routine 34. The semester/term is of critical importance because CRN's (course registration numbers), advisor codes and special approval codes are term-specific.

In step 38, a large variety of student information is retrieved from the host computer 24 and stored in the memory 20 such as matriculation term, last term, classification, college, major, name, educational objective and the like. In step 39, as discussed more fully hereinafter, the student is asked a series of questions to update school records. The caller is then given the option of selecting a routine to register for a course or courses, to drop a course, to ask if a seat is available in a particular class, to check one's schedule if registered previously, to determine what fees are owed, to pay any fees owed by credit card, and to determine whether there are any holds as of the date of the call that would prevent immediate registration. Many of these routines are known in the art and, in the interest of brevity, the details are omitted.

If the student chooses registration 40, an elaborate series of routines execute, only some of which are shown in FIG. 2. First is a hold check routine 42 that executes to determine if the student has failed to meet certain institutional requirements, owe parking tickets, has books overdue at the library, owe library fines or has otherwise been blocked from registering for major or minor sins. The holds routine 42 may be relatively straight forward, treating all holds as fatal, or may be more sophisticated as discussed in conjunction with FIG. 10. If the student fails the hold routine 42, the registration routine 40 exits through a quit routine 44 which may be the same as or different from the quit routine 34. If the student passes the hold routine 42, registration proceeds to advisor code check routine 46 and determines if the student must have an advisor code to register.

Figure 3:
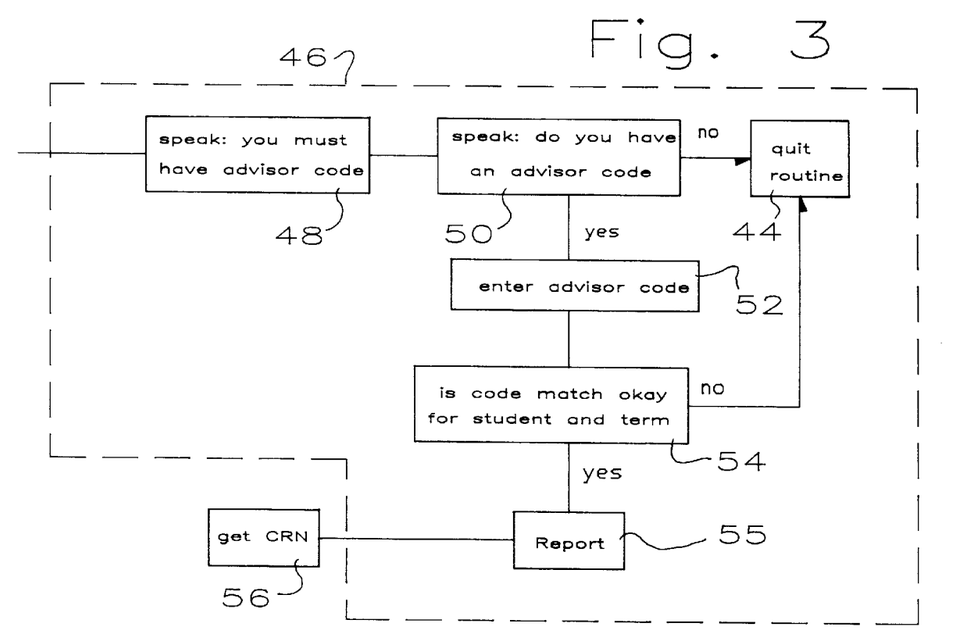
FIG. 3 is a flow chart diagram of an advisor code routine of this invention.

If an advisor code is needed, the advisor code routine 46 executes as shown in FIG. 3 and the voice transmission device 16 tells the student in step 48 that an advisor code is needed to register and asks the student in step 50 if the student has it. If the student responds no, the program exits through the quit routine 44. If the student has an advisor code, the student is asked in step 46 to enter it. The entered advisor code is processed in step 54 to determine if it is correct. If it is correct, a report is generated in step 55 to the computer 18 or the host computer 24 and a list is compiled of the students who use an advisor code and the action taken, i.e. whether a course has been added or dropped. When the advisor code routine 46 is completed, the caller reenters the registration program 40 and proceeds to step 56, Get CRN.

In step 56, the student is asked by the voice transmission device 16 to enter a course registration number, known as a CRN. CRN's are available from the semester class schedule publications issued to students by the registrar. The CRN is a series of numbers, symbols, letters or combination thereof which identify not only the course, but also the course subject name and level number, and the section designation which includes the time and room the course will be taught.

After the voice transmission device 16 repeats the CRN and asks the student to confirm the number, a determination is made in step 58 whether the course requires special approval to be taken—over and above an advisor's code. These situations are typically advanced or graduate courses, often seminars, where the instructor department feels that a degree of control over the class composition is necessary. Typically, the student receives the special approval code from the course instructor, the head of the department offering the course or the like. If the course does not require special permission of the instructor or department, registration moves to the next routine 60 which is the start of the co-requisite routine.

Figure 4:
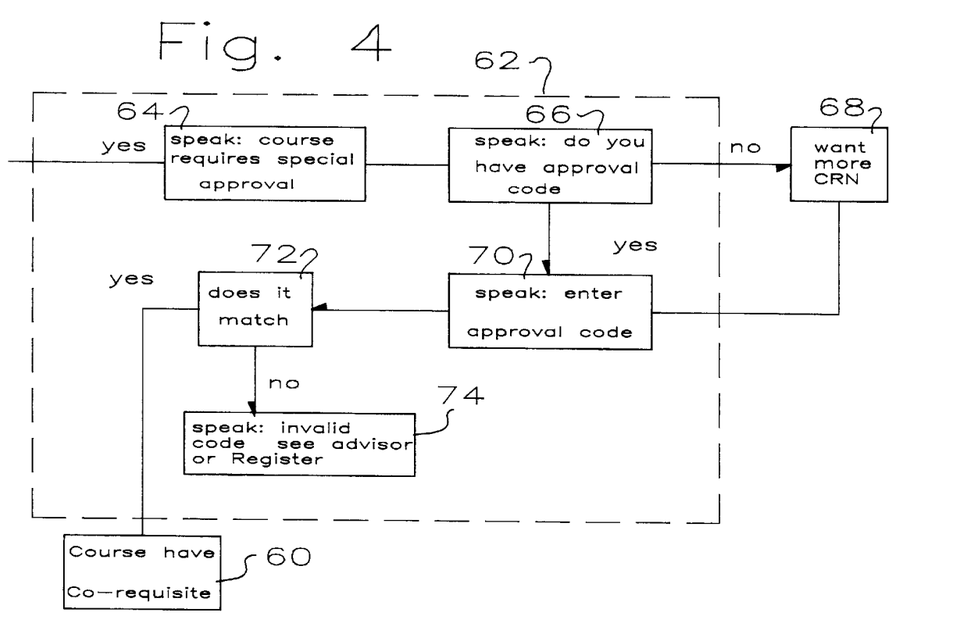
FIG. 4 is a flow chart diagram of a special approval routine of this invention.

If special approval is required, the routine 62 executes as shown in FIG. 4. The voice transmission device 16 states, in step 64, that the course requires special approval and asks, in step 66, whether the student has the approval code, typically received from the course instructor or department administrator. If the student does not have the approval code, the program moves to step 68 where the student chooses to select another CRN or cease the CRN requests, in which case the registration routine moves to the repeat schedule routine as more fully explained hereinafter.

If the student has the approval code, the voice transmission device tells the student to enter the code in step 70 via the touchtone telephone keypad. In response to the entered code, a decision is made in step 72 whether the code matches with an acceptable approval code, which may be determined by comparison with a table or formula. If the code does not match, the student is told, in step 74, that the code is invalid and to consult with the instructor or the registrar and the program moves to step 68, Want More CRN. If the code does match, the special approval—routine 62 is complete and the program proceeds to step 60 to determine if the requested CRN has a co-requisite.

Co-requisites are courses which must be taken during the same semester. Typical examples are a theory course and a corresponding lab. Using system translation tables on the computer 18 or the host computer 24, the CRN's are converted into course subject name, number and time/room designations and compared to the course designations of other CRN's on a data base comprised of corresponding co-requisites. If the course does not have a co-requisite, the program moves to step 76 to enter the requested CRN into the host computer memory 26 to add the course to the student's schedule.

Figure 5:
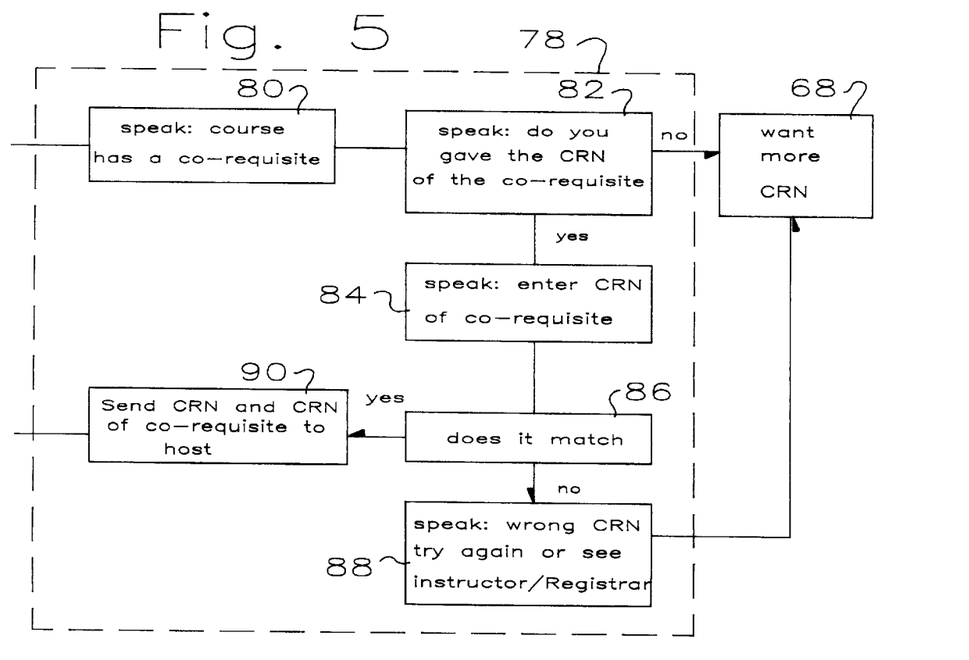
FIG. 5 is a flow chart diagram of a co-reguisite routine of this invention.

If the course has a co-requisite, the co-requisite routine 78 executes as shown in FIG. 5. The voice transmission device 16 tells the student in step 80 that the course does indeed have a co-requisite and, in step 82, asks the student whether they have the CRN of the co-requisite. If the student responds no, the program takes the student back to step 68, Want More CRN, or quitting. If the student responds yes, the voice transmission device 16 tells the student, in step 84, to enter the CRN of the co-requisite. In step 86, the same type inquiry is made to determine whether the CRN entered by the student designates a course which is, in fact, a co-requisite. If there is no match, the voice transmission device 16 tells the student in step 88 that there is no match, to try again with a different CRN of the co-requisite, to see the instructor, to see an advisor or the like and the program takes the student back to step 68, Want More CRN. If there is a match, the CRN of the course sought to be registered in and the CRN of the co-requisite are entered in the host computer memory 26 in step 90 so the student will, in fact, be registered for both courses.

In step 92, course errors, tests are done to determine whether there are any discernable mistakes in the course selections, e.g. comparisons are made to see if the course section has been closed, whether the student has already registered for the same course in a different section, whether there is a time conflict with another course already on the schedule, whether the addition of the course or courses would be an overload for that student, and the like. If an error is detected in step 92, the student is told what it is by the voice transmission device 16 and then the student is passed to step 68, Want more CRN?.

If no restrictive course errors are found, the registration routine 40 determines in a routine 94 if the CRN has any pre-requisite requirements, i.e. courses that must have been successfully completed prior to taking this particular CRN. This is done by querying a prerequisite system translation table in the computer 18 or the host computer 24. This query uses more than a simple table of CRN's because CRN's change each semester to indicate the section designations of a course. The translation tables convert the CRN into course subject names and numbers and compares them to the CRN's course subject name and number. Then the program consults another table to see if there are any prerequisite courses attached to the requested CRN. If the CRN has no pre-requisites attached to it, the program proceeds to a routine 96 where the student is told the CRN/course subject has been added to the student's schedule.

Figure 6:
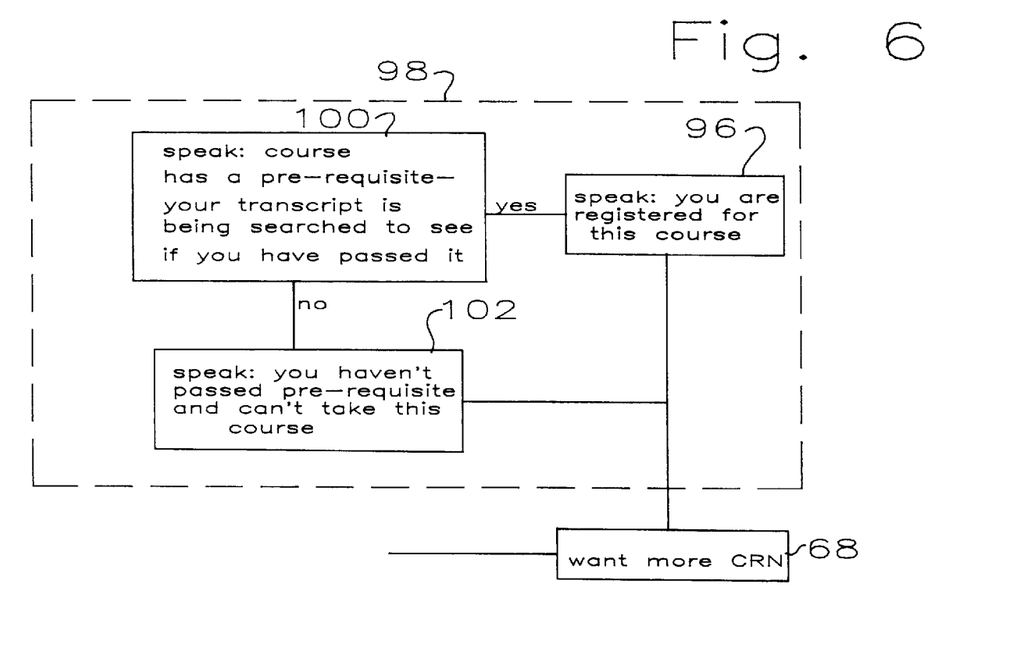
FIG. 6 is a flow chart diagram of a pre-requisite routine of this invention.

If the course has one or more pre-requisites, a prerequisite routine 98 executes to determine if they have been successfully completed. As shown in FIG. 6, in step 100, the voice transmission device 16 tells the student a prerequisite is required and queries the host computer 24 to check the student's academic history. The academic history or transcript of the student is searched for a match to the subject and number of the subject and number of the requested CRN. If the student has not passed the pre-requisite, the student is told in step 102, that the prerequisite has not been passed, the student cannot register for the selected course and the program goes to step 68, Want More CRN. If the student has passed the pre-requisite, the student is told in step 96 that the course has been added to the schedule. In step 68, Want More CRN, the student is asked whether another course is sought or whether registration is complete. If another course is sought, the program repeats beginning at step 56, Get CRN. If no additional course is sought, the program proceeds to a repeat schedule routine 104.

Figure 7:
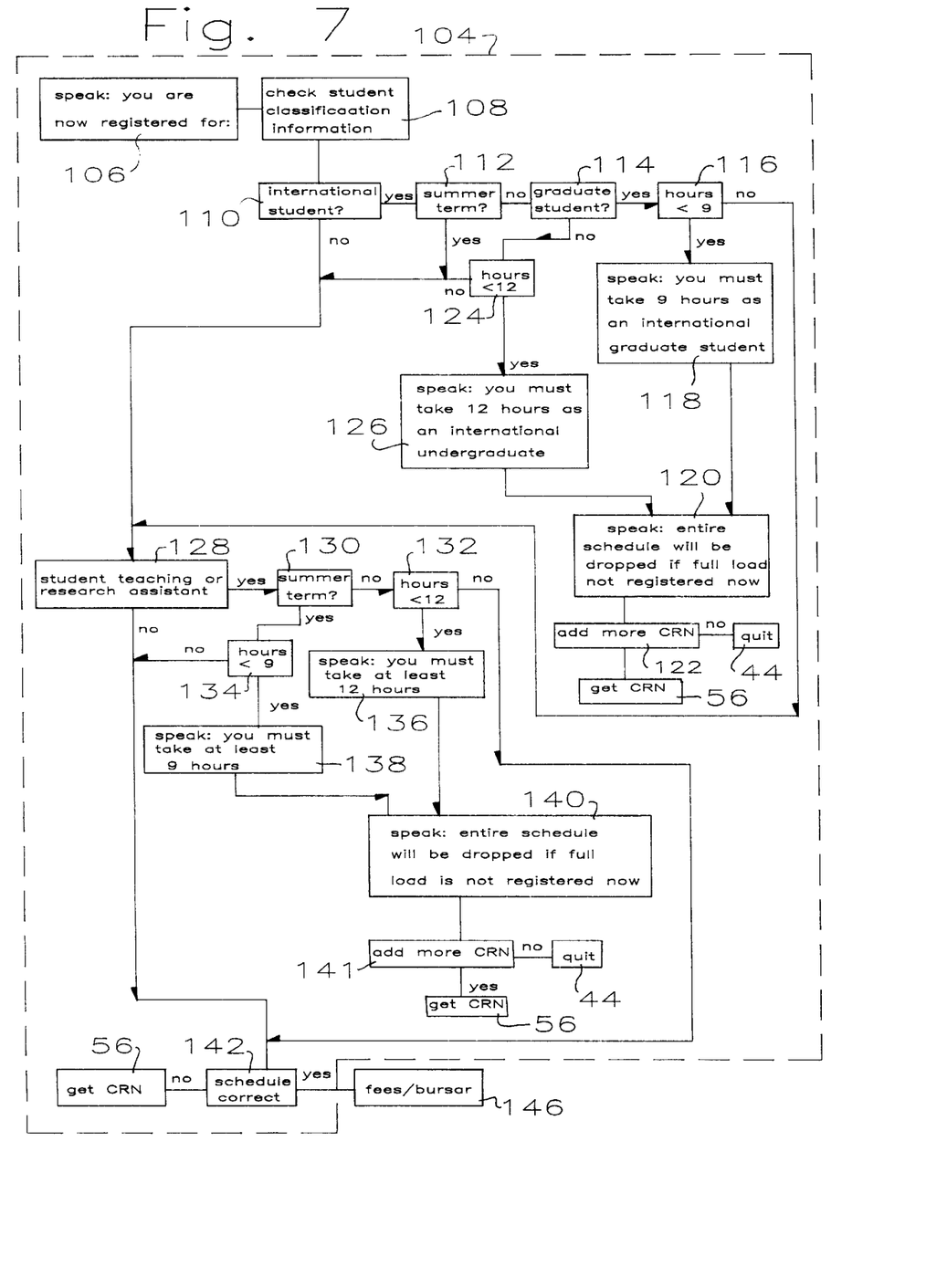
FIG. 7 is a flow chart diagram of a repeat schedule routine of this invention.

The repeat schedule routine 104 executes as shown in FIG. 7. In step 106, the host computer 24 is queried to find all the courses on the student's schedule and the voice transmission device 16 tells the student the schedule. In step 108, the student classification information collected in step 38 is queried to find out whether the student falls into a class of students who are required to take a predetermined minimum number of hours during spring, fall and summer hours. This typically applies to international students, research assistants and teaching assistants.

If the information from step 108 reveals the student is an international student, step 110 shunts the caller to step 112 where a determination is made whether the term is summer, which now requires no minimum hours, or spring/fall, which requires a minimum course load. In step 114, the student's undergraduate or graduate classification is determined. If the student is a graduate student, step 116 makes a comparison between the number of hours the student has registered for and the predetermined minimum, which for exemplary purposes is assumed to be nine hours for spring/fall terms. If the international student is a graduate student and has not registered for the minimum number of required hours, the voice transmission device 16 tells the student, in step 118, that an international graduate student must take a minimum of nine hours in the spring or fall term. Step 120 tells the student that the entire schedule will be dropped if the full course load is not registered for at that time. In step 122, the student is offered the option to add more courses via step 56 or to discontinue the registration process through the quit routine 44. If the student opts to add more courses, the program returns to Get CRN, step 56, and the registration program 40 repeats.

Referring back to step 114, if the determination is that the student is an undergraduate international student, a determination is made in step 124 whether the student is taking the predetermined minimum number of hours, assumed to be twelve for purposes of illustration. If not so registered, the student is told in step 126 that twelve hours is the minimum required load and in step 120 told that the entire schedule will be dropped unless courses are added, via step 122 and step 56, Get CRN.

A non-international student passes step 110 and proceeds directly to step 128 where a determination is made if the student is a teaching assistant, research assistant or on a scholarship where a minimum number of course hours per term are required. The registration path of undergraduate or graduate international students who have passed the tests in steps 112–116, 124 also proceed to step 128 to determine if the student is a teaching assistant, research assistant or on a scholarship where a minimum number of course hours per term are required because the requirements may be different. If the student is a teaching or research assistant, step 130 determines if the term is summer or spring/fall. If the term is spring/fall, step 132, or summer, step 141, a comparison is made between the number of hours the student has registered for and the predetermined minimum, which for exemplary purposes is twelve hours for spring/fall terms and nine hours for summer. If the student has not registered for the minimum number of required hours, the voice transmission device 16 tells the student so in step 136, 138 respectively. Step 140 tells the student that the entire schedule will be dropped if the full course load is not registered for at that time. In step 141, the student is offered the option to add more courses via step 56 or to discontinue the registration process through the quit routine 44. If the student opts to add more courses, the program returns to Get CRN, step 56, and the registration program 40 repeats.

Once the student has successfully passed through the course load check in the early part of the repeat schedule routine 104, the student is asked in step 142 whether the schedule read in step 106 plus any additions made is correct. If the schedule is not correct, the student passes to step 56, Get CRN where more courses are selected, or courses are dropped. If the schedule read in step 142 is correct, the next phase of the program is to allow the student to calculate fees and pay the bursar in a routine 146.

Figure 8:
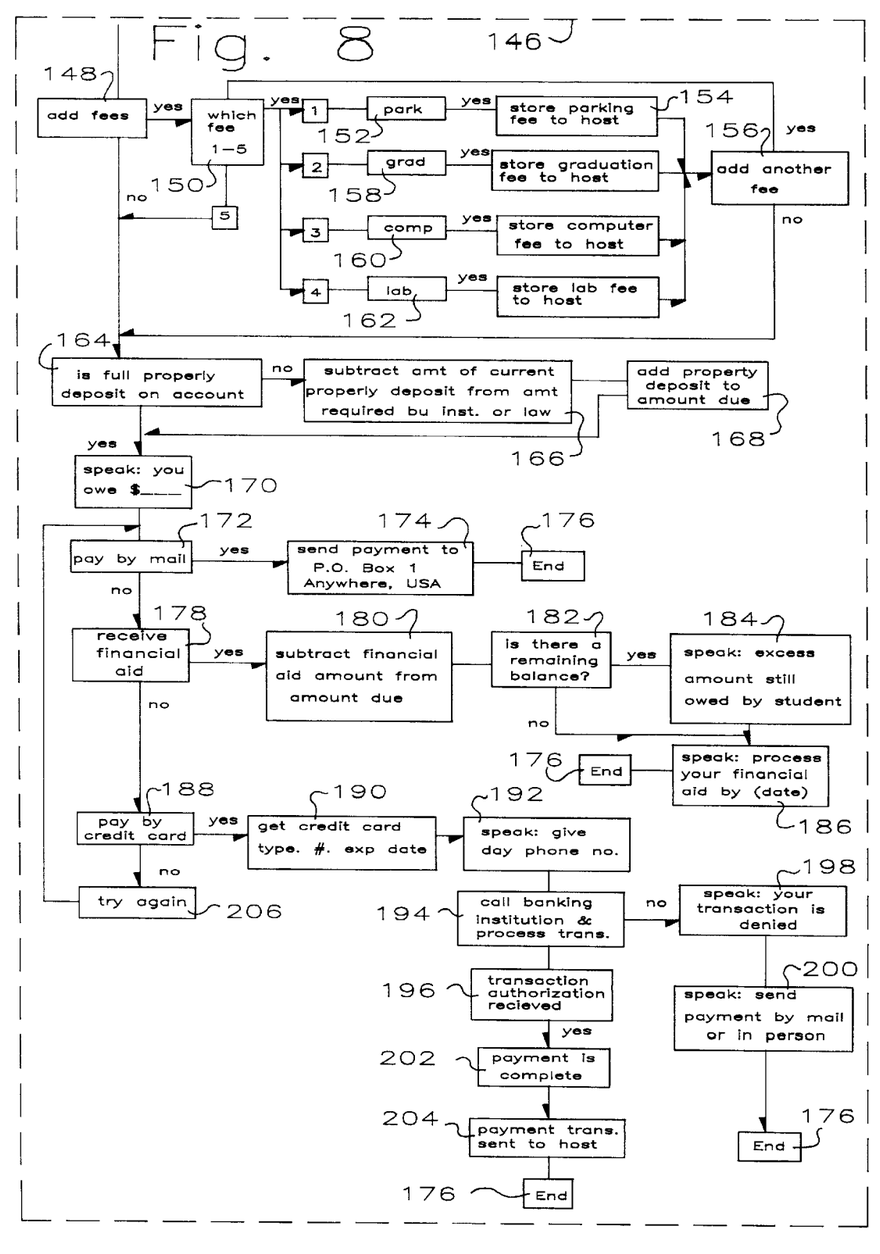
FIG. 8 is a flow chart diagram of a fees/bursar routine of this invention.

As shown in more detail in FIG. 8, the student is told in step 148 that any special fees can be added to the bill, such as parking fees, computer use fees, graduation fees, lab fees and the like. The student is asked to select which fees in step 150. If parking is selected, the student is passed to a parking routine 152 where the student selects parking options such as preferential lots, which semesters, for how many cars and the like. The calculations are made and passed to the host computer 24 in step 154. The student is asked, in step 156 whether another fee is to be added and, if so, the process proceeds to step 150 where the student has the choice of selecting additional fees, such as graduation fees in step 158, computer fees in step 160 and or lab fees in step 162. It will be seen that this loop continues until the student finally selects, in step 156 that no additional fees are to be added.

The student is then passed to a routine 164 to determine if the student has paid any property deposits required by law or by the institution. Property deposits are required to reimburse the institution for breakable and loseable supplies used by students. In the routine 164, the host computer 24 or the computer 18 is queried to determine if the student had paid the property deposit in the past. In step 166, any current charges against the property deposit are accounted for by deducting the current balance from the amount required and, in step 168, the balance is added to the student's bill.

In step 170, the student is told the amount of the bill for tuition, plus any fees and the property deposit. In step 172, the student is asked whether the bill is going to be paid by mail and, if the student answers yes, the student is told in step 174 to send a check to the bursar's address and the registration process is completed in an ending routine 176.

If the student answers no to the question of paying by mail in step 172, the student is asked in step 178 whether financial aid is to be received. If the student answers yes, the host computer 24 is asked what the amount of financial aid will be and the amount is deducted from the bill in step 180 and a balance in determined in step 182. If a balance remains, the student is told so in step 184. In step 186, the student is told to complete the financial aid process by some predetermined date and the registration process ends in the ending routing 176.

If the student answered no to the question of receiving financial aid in step 178, the student is asked in step 188 whether payment will be by credit card. Credit information is retrieved in step 190 and, in step 192, a daytime telephone number is asked for and received. In step 194, a telephone call is made by the computer 18 to the banking or financial institution issuing the credit card and authorization to charge is given or denied in step 196. If the transaction is denied, the student is told so in step 198 and, in step 200, the student is told to send payment by mail to the bursar's address or to pay in person and the registration process is completed in the ending routine 176.

If the transaction is authorized in step 196, the charge is made to the financial institution and the student is told in step 202 that payment is complete. In step 204, the fact that payment has been made in reported to the host computer 24 and the registration process ends in the ending routine 176.

If the student is so hapless as to answer no to the question in step 188 that payment will not be by credit card, a try again routine 206 sends the student back to step 172 and another attempt is made to secure payment or arrangements to pay.

In addition to the registration effort in routine 40, the program 30 may include simpler information gathering routines available to the student over a touch tone phone. These routines are available after step 38 and the student has the option of selecting registration in step 40 as discussed above, dropping courses in a drop routine 208, determining if a seat is available in a particular class in step 210, checking the student's schedule in step 212, determining what fees are due in step 214, checking to see what holds might prevent registration in step 216, quitting in step 218 and the like. It will be evident that much of the program for the information routines in steps 210–216 may be lifted from the registration routine 40.

Figure 9:
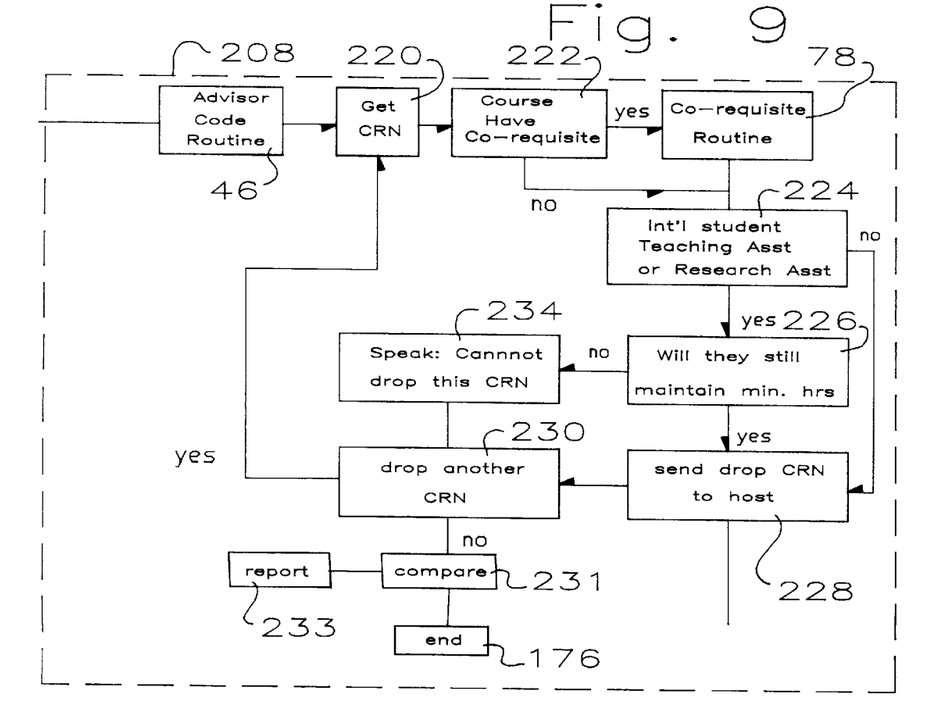
FIG. 9 is a flow chart diagram of a drop course routine of this invention.

Referring to FIG. 9, the advisor code routine 46 executes because if advisor approval is necessary to register for a course, it is also necessary to drop a course. The advisor code routine 46 associated with the drop routine 208 requires a different numerical entry from the student than required in the registration program 40. These codes may be derived and then verified based on a formula known to the advisors. If the student clears the advisor code routine 46, the CRN of the course to be dropped is encoded by the student in step 220. In step 222, an inquiry is made to the host computer 24 or the computer 18 to determine if the course to be dropped has a co-requisite and, if so, the co-requisite routine 78 executes. In step 224, a determination is made if the student is an international student, a teaching assistant or research assistant and, in step 226, a determination is made if the requirement of a minimum number of hours is maintained.

If the answer is yes, the host computer 24 is told in step 228 of the drop and the student's schedule is accordingly adjusted. If the student desires to drop another course, the inquiry is made in step 230 and the process ultimately ends in the routine 232. If the answer in step 226 is no, the student is told in step 234 that the course cannot be dropped and the student is asked in step 230 whether another course is to be dropped instead. When the student indicates no more classes are to be dropped, a comparison is made in step 231 to see if the student has dropped all courses on the schedule and, if so, a report is made in step 233 to the host computer 24 to that effect.

The holds routine 42 may be relatively straight forward where any hold blocks registration. Preferably, the hold routine 42 is more sophisticated and executes as in FIG. 10. In step 236, the host computer 24 is queried to find out if any holds exist and, if not, the student is allowed to continue with the registration routine in step 46. If the student does have holds, the effective or active date of the hold is determined in step 240. If the dates are too old as compared to some cut off date established by the institution, the holds are deemed stale and the student is allowed to proceed with registration.

Figure 10:
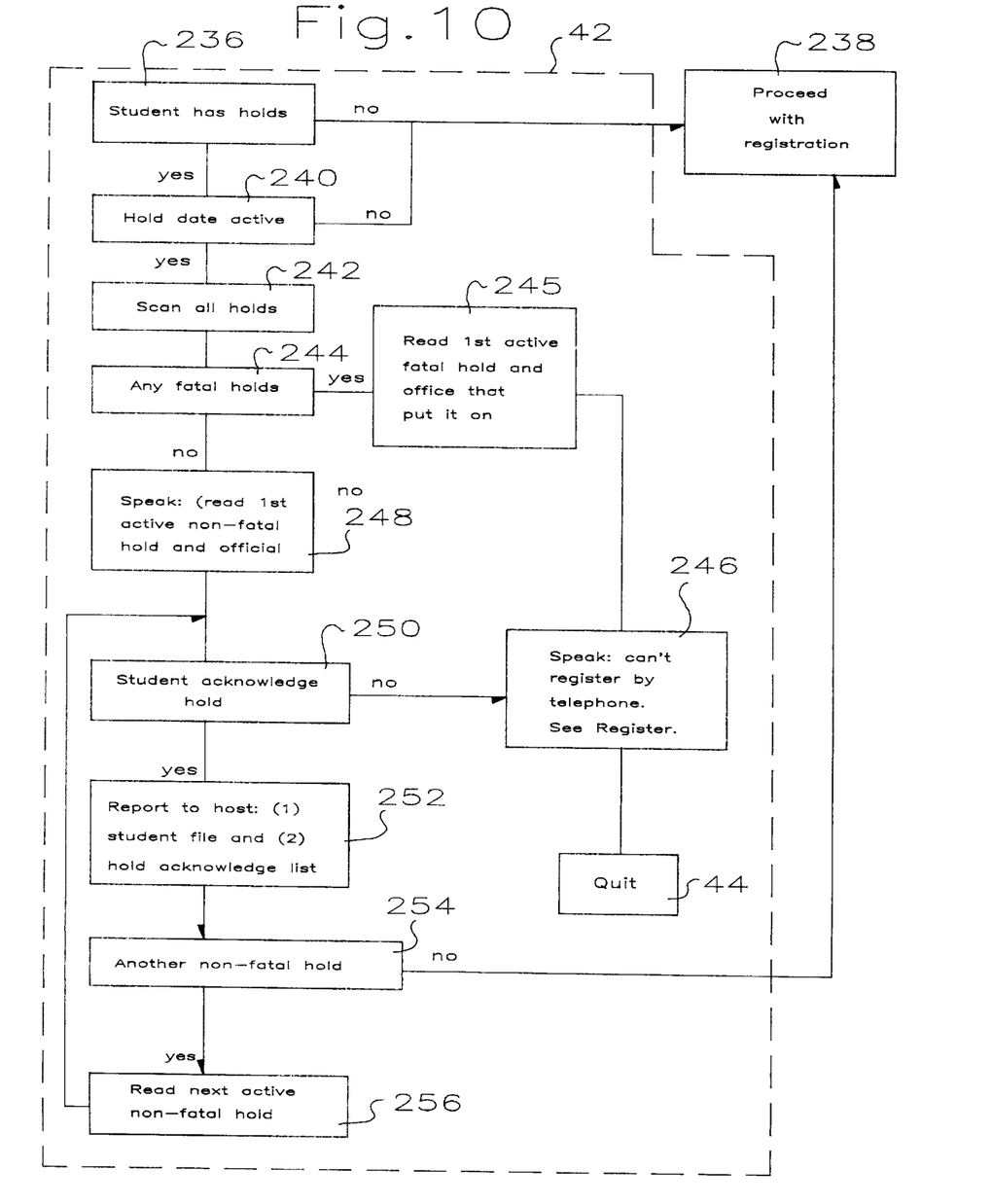
FIG. 10 is a flow chart diagram of a more sophisticated holds technique.

If the dates are active as compared to the cut off date, all the holds are scanned in step 242 and, in step 244, a determination is made if any of the holds are fatal. Fatal holds are major sins such as having dropped all courses the previous semester, bad grades or academic probation, no green card for international students, a bad check the previous semester which has not been cleared, a large number of fines or parking tickets, missing test scores, missing transcript or other matters deemed serious by the institution. If one or more fatal holds exist, the student is told, in step 245, the hold type and told which office they must see to clear the hold. In step 246 the student is told that registration cannot be done by telephone and the student must see the registrar. The program then exits through the quit routine 44.

If the holds checked in step 244 are not fatal, such as a small number of fines or parking tickets, overdue or lost library books, or other minor transgressions, the student told in step 248 of the first non-fatal hold on the list and the office where the matter can be cleared up. The student is asked in step 250 to acknowledge knowing about the hold and agreeing to clear it up. If the student declines, the program proceeds to step 246 where the student is told that registration cannot be by telephone and to see the registrar. If the student acknowledges the hold in step 250, a report is made to the host computer in step 252 in two respects. One, a report is made of each hold a student acknowledged on a given date and, two, a list is made by department or office of each hold type and who acknowledged what holds.

In step 254, a determination is made if there is another non-fatal hold and, if so the next non-fatal hold on the list is read to the student in step 256 and the acknowledgement process repeats through step 250. Ultimately, the student exits to step 238 and the program proceeds.

A substantial advantage of the registration process of this invention is the ability to generate information and reports of significant management interest as partially explained previously. For example, in step 252 in FIG. 10, two notations are made in the host computer. First, an entry is made on a hold report that the student has acknowledged the hold and has agreed to deal with it. Second, a report is generated listing the hold types and the students who have acknowledged the existence of a hold. This report is preferably sorted by office, i.e. separate lists are made for parking tickets, library fines and the myriad of other departments that are affected.

The maximum size of many courses are predetermined by the department offering the course. When the number of students enrolled in a particular course exceeds the predetermined number, the course is closed and no further students are admitted to the class. The prior art touchtone registration systems known to applicant basically have the capability to add courses and drop courses only. Typically, these systems collect all the registrations occurring in one day into a batch, process the batch in the evening and thus provide reports the next morning on the preceding day's activity. In accordance with this invention, reports can be generated upon demand by a department administrator to show how many students have registered for the courses offered by the department or such reports can be generated at predetermined times or intervals, e.g. at noon and 5 p.m. This information is important because it allows the department to add course sections in high demand in immediate response to that demand.

In other situations, courses have very large predetermined theoretical maximum sizes but are scheduled for much smaller rooms because, as a practical matter, enrollment in the classes rarely exceeds the room size. In accordance with this invention, a comparison is made between the number of students enrolled in a particular class and the size of the room in which the course is scheduled. When the number of students becomes larger than the room size, a report is generated to the department administrator and a larger room is selected if one is available or the course is closed. This decision is the administrators. The course can be closed simply by changing the predetermined size.

Figure 11:
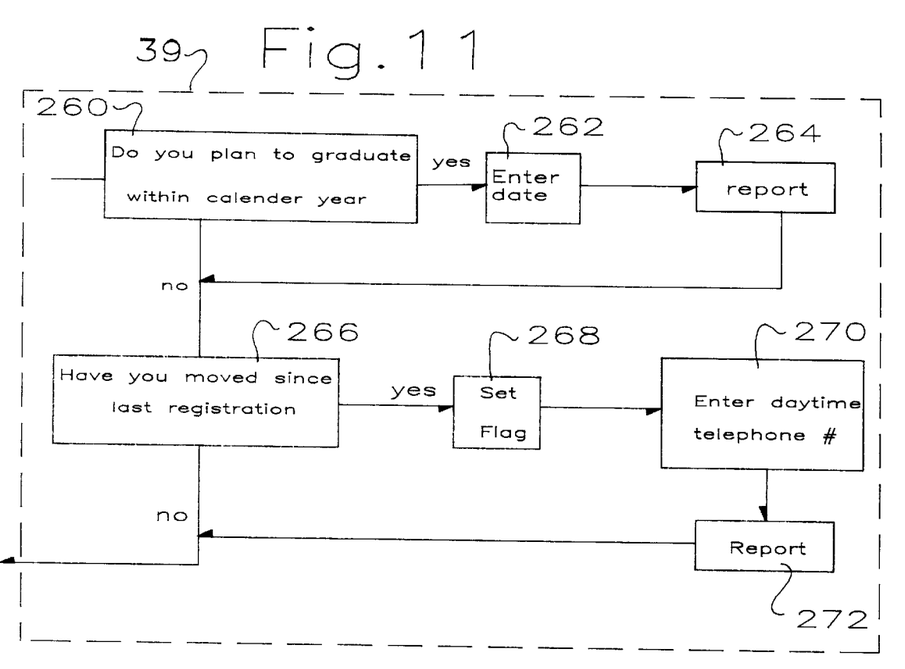
FIG. 11 is a flow chart diagram of a question routine.

Referring to FIG. 11, in step 39, the student is asked various questions updating the school's records. In step 260, the student is asked if they intend to graduate during the calendar year. In step 262, the student is asked to enter the date. In step 264, a report is generated and ultimately delivered to the registrar's office to provide an indication of the number who will graduate each semester and how many graduation applications can be expected.

In step 266, the student is asked whether they have moved since last registration. If the answer is yes, the computer 18 sets a flag in step 268 to route the caller through a transfer call routine when exiting the registration program, or any of the subroutines, in steps 44, 176 or 218. In step 270, The student is asked to enter a daytime telephone number. In the transfer call routine, the call is simply transferred to a voice mail network, answering machine or operator and the caller is prompted to leave the new address information at the end of the caller's session. A report is made in step 272 of all callers answering affirmatively along with the daytime telephone numbers, and this report is cross-referenced with the data gathered in the call transfer routine. It is necessary to transfer the student out of the registration routine 40, or any of its subroutines, for the purpose of spelling street names, city names and the like.

Occasionally, students will register for one or more courses and then drop all courses. It is important for the registrar and bursar to know how many students have registered at any given time. Any time a student drops all courses, as determined in step 231, a report is made to the host computer 24 and a list compiled of all such students. This list assists in verifying total enrollment and finding those students who have dropped all courses.

In a program as complex as this one, a fair number of students will not succeed in completing registration. Some of these will fail for good reason, i.e. the system is designed to prevent them from registering. Some of these fail for bad reasons, i.e. they fail to understand the directions or quit out of frustration. It is important to know at what point students unsuccessfully quit the registration program 40 because if a sizeable number of students fail at the same location or in the same general area, it suggests modification of the program is in order. Thus, the computer 18 cumulates the locations where the registration process ends, either at a designed ending point, such as one of the quit routines 34, 44, at the ending routine 176 or the like, or at some unintended point, as when the student simply hangs up. At the end of registration or on demand, a report is generated from the cumulation and studied to determine if further modification of the registration routine 40 is needed.

Figure 12:
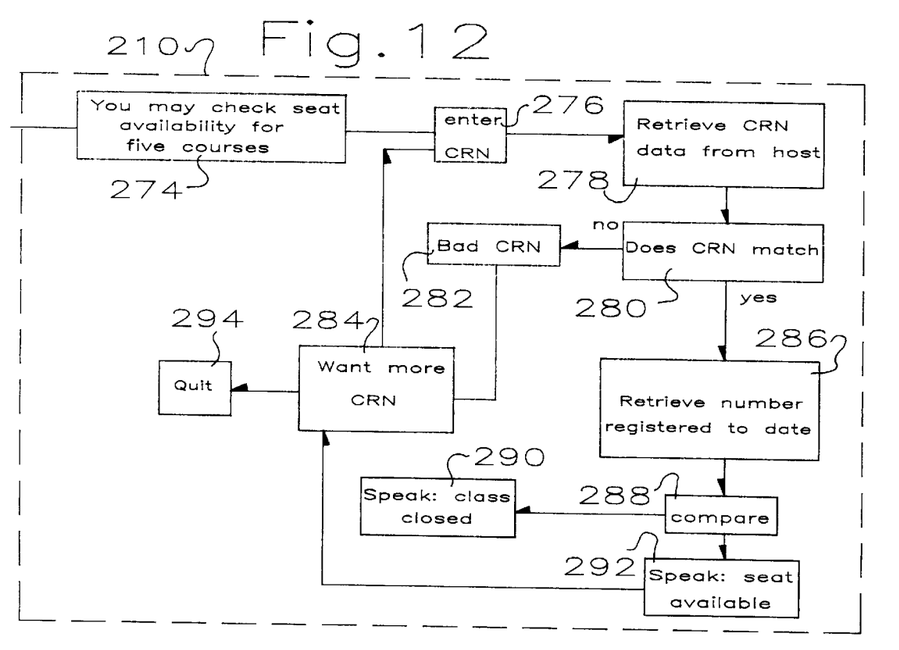
FIG. 12 is a flow chart diagram of a seat availability routine.

Referring to FIG. 12, the seat available routine 210 is disclosed in greater detail. Upon entering the routine 210, the student is told in step 274 that a predetermined number of classes, e.g. five, may be checked to see if a seat is available. In step 276, the student is told to enter the CRN of the course. In step 278, a table of CRN's offered and their maximum allowable size is retrieved from the host computer 24. In step 280, the CRN entered by the student is compared against the CRN table retrieved from the host computer. If the CRN entered by the student does not match any of the CRN's in the table, the student is told in step 282 that the entered CRN is incorrect. In step 284, the student is asked whether he wants another CRN and, if so, the process repeats.

If the CRN's do match, the number of students registered to date in the course is retrieved from the host computer 24. In step 288, this number is compared to the maximum number of students allowed in the course. If the course has been filled, the student is told in step 290 that the class is closed and then the student is asked, in step 284, is more CRN is wanted. If step 288 reveals there is still room in the class, the student is told so in step 292 and then asked, in step 284, if more CRN is wanted. Sooner or later, the routine ends through a quit routine 294.

Although this invention has been disclosed and described in its preferred forms with a certain degree of particularity, it is understood that the present disclosure of the preferred forms is only by way of example and that numerous changes in the details of operation and in the combination and arrangement of parts may be resorted to without departing from the spirit and scope of the invention as hereinafter claimed.

I claim:

1. In a telephone course registration system of the type where a student, by entering information on a telephone, registers for an educational term by selecting at least one course offered by an educational institution, the registration system comprising a data processor, means connected to the data processor for generating a voice message and delivering the voice message to the telephone in response to instructions from the data processor, at least one incoming telephone line connected to the data processor, and means for matching an identification number provided by the student with a predetermined list of identification numbers corresponding to students approved for registration, the improvement comprising a first database means, connectable with the data processor, for storing a list of courses satisfactorily completed by the student;

a second database means, connectable with the data processor, for storing a list of courses and any associated prerequisite courses which must be satisfactorily completed before a selected course may be registered for;

retrieval means for retrieving from said first database means the list of courses satisfactorily completed by the student having an identification number on the predetermined list;

determining means for searching said second database means and determining the associated prerequisite courses required for the course selected by the student; and comparison means for comparing the list of courses satisfactorily completed by the student with the associate prerequisite courses required for the course selected by the student to determine if the student may register for the selected course, wherein said comparison means makes the determination whether the student may register for the selected course while the student is in telephone communication with the telephone course registration means.

2. The system of claim 1 further comprising means causing the voice message generating and transmitting means to tell the student that the prerequisite course has not been successfully taken in response to a determination that the prerequisite course has not been satisfactorily completed.

3. In a telephone course registration system of the type where a student, by entering information on a telephone, registers for an educational term by selecting at least one course offered by an educational institution, the registration system comprising a data processor, means connected to the data processor for generating a voice message and delivering the voice message to the telephone in response to instructions from the data processor, at least one incoming telephone line connected to the data processor, and means for matching an identification number provided by the student with a predetermined list of identification numbers corresponding to students approved for registration, the improvement comprising a database means, connectable with the data processor, for storing a list of courses and any associated co-requisite courses which must be taken at the same time before a selected course may be registered for;

retrieval means for retrieving from said database means a list of co-requisite courses which must be taken at the same time as the course selected by the student having an identification number on the predetermined list;

notification means for notifying the student that a co-requisite course is required for the course selected by the student and requesting the student to further select said co-requisite course; and comparison means for comparing said co-requisite course selected by the student with said list of co-requisite courses for said selected course to determine if the required co-requisite courses for said selected course have been selected, thereby allowing the student to register for said selected course, wherein said comparison means makes the determination whether the student may register for the selected course while the student is in telephone communication with the telephone course registration system.

4. The system of claim 3 further comprising means causing the voice message means to tell the student that the selected course has a second course that must be taken at the same time.

5. In a telephone course registration system of the type where a student, by entering information on a telephone, registers for an educational term by selecting at least one course offered by an educational institution, the registration system comprising a data processor, means connected to the data processor for generating a voice message and delivering the voice message to the telephone in response to instructions from the data processor, at least one incoming telephone line connected to the data processor, and means for matching an identification number provided by the student with a predetermined list of identification numbers corresponding to students approved for registration, the improvement comprising a first database means, connectable with the data processor, for storing a list students approved for registration;

a second database means, connectable with the data processor, for storing a status of a property deposit account corresponding to each of the students;

authorization means for searching said first database means and determining if the student has an identification number on the predetermined list; and comparison means for searching said second database means and determining if the student having an identification number on the predetermined list has a property deposit account balance less than a predetermined balance, wherein said comparison means makes the determination whether the student has a property deposit account balance less than a predetermined balance while the student is in telephonic communication with the telephone course registration system.

6. In a telephone course registration system of the type where a student, by entering information on a telephone, registers for an educational term by selecting at least one course offered by an educational institution, the registration system comprising a data processor, means connected to the data processor for generating a voice message and delivering the voice message to the telephone in response to instructions from the data processor, at least one incoming telephone line connected to the data processor, and means for matching an identification number provided by the student with a predetermined list of identification numbers corresponding to students approved for registration, the improvement comprising a database means, connectable with the data processor, for storing a list of students approved for registration and holds attributed to each of the listed students;

means for searching said database means and determining if the student having an identification number on the predetermined list has at least one hold;

scanning means for scanning the holds of the student to segregate the holds into a group of fatal holds and a group of non-fatal holds;

termination means responsive to said scanning means for terminating registration in response to the existence of a fatal hold;

inquiry means responsive to said scanning means for reading a first of the non-fatal holds to the student and asking the student to acknowledge the existence of the first non-fatal hold; and acknowledging means allowing the student to acknowledge the existence of the first non-fatal hold while the student is in telephonic communication with the telephone course registration system.

7. The system of claim 6 further comprising means for generating a list of students acknowledging the existence of the non-fatal hold.

8. The system of claim 6 further comprising means responsive to acknowledgement of the existence of the first non-fatal hold for reading a second non-fatal hold to the student and asking the student to acknowledge the existence of the second non-fatal hold.

9. A telephone system for an educational institution offering courses for informing a student communicating by a telephone if a seat is available in a selected course, comprising a data processor;

means connected to the data processor for generating a voice message and delivering the voice message to the telephone in response to instructions from the data processor;

at least one incoming telephone line connected to the data processor; and means for determining the availability of a seat in the selected course, including means for receiving an indicia representative of a course offered by the institution and entered by the student on the telephone;

means for querying a host computer of the educational institution to determine the maximum number of students allowed in the course corresponding to the indicia;

means for querying the host computer of the educational institution to determine the number of students actually registered in the course corresponding to the indicia;

means for comparing the maximum number of students allowed in the course with the number of students actually registered in the course;

means for causing the voice message means to tell the student if a seat is available in response to there being a greater number of students allowed in the course than the number of students actually registered in the course and to tell the student if the course is closed in response to there being as many students actually registered in the course as the maximum number of students allowed in the course.

10. The telephone system of claim 9 further comprising means for matching an identification number provided by the student with a predetermined list of identification numbers corresponding to students approved for registration.

11. The telephone system of claim 10 further comprising a telephone course registration system of the type where a student, by entering information on a telephone, registers for an educational term by selecting at least one course offered by an educational institution, the registration system comprising the data processor, the means connected to the data processor for generating a voice message and delivering the voice message to the telephone in response to instructions from the data processor, at least one incoming telephone line connected to the data processor, a database means, connectable with the data processor, for storing a predetermined list of identification numbers corresponding to students approved for registration, and authorization means for searching said database means and determining if a particular student has an identification number on the predetermined list.

* * * * *